(Model.)

J. R. WILSON.
DOUBLE SHOVEL PLOW.

No. 245,907. Patented Aug. 16, 1881.

Witnesses:
W. C. Thomas
John Munnel

Inventor:
John R. Wilson

UNITED STATES PATENT OFFICE.

JOHN R. WILSON, OF WAYNESBURG, PENNSYLVANIA.

DOUBLE-SHOVEL PLOW.

SPECIFICATION forming part of Letters Patent No. 245,907, dated August 16, 1881.

Application filed October 28, 1880. (Model.)

*To all whom it may concern:*

Be it known that I, JOHN R. WILSON, of Waynesburg, in the county of Greene and State of Pennsylvania, have invented certain new and useful Improvements in Double-Shovel Plows; and I do hereby declare the following to be a full, clear, and exact description of the the same, refence being made to the accompanying drawings, forming a part of this specification, and in which—

Figure 1:
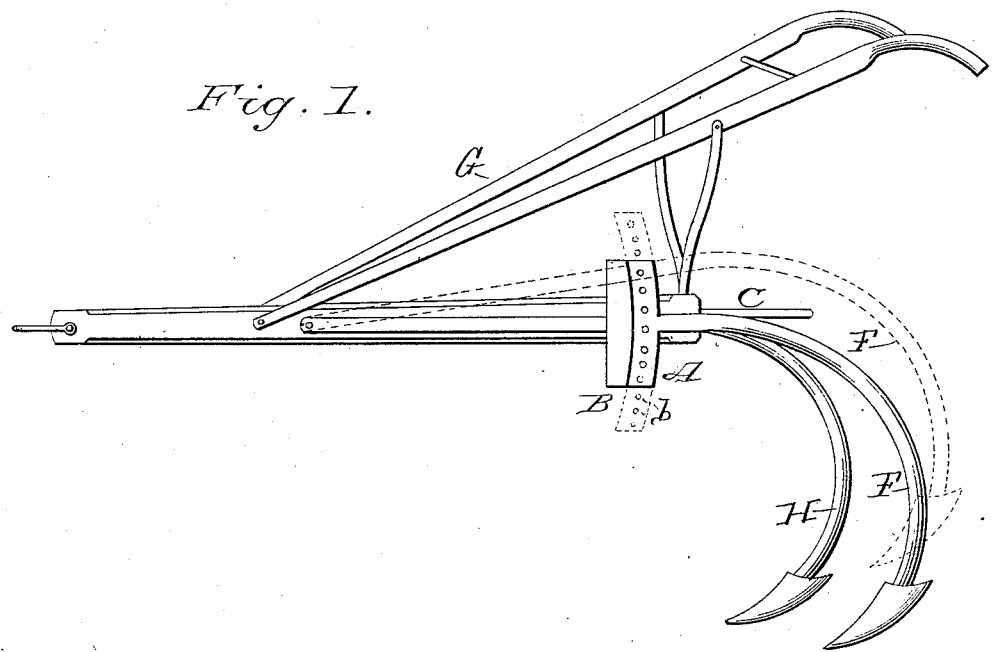
Figure 2:
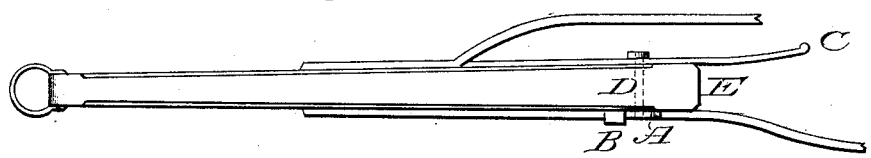

Figure 1 represents a side elevation of my improved plow; Fig. 2, a top plan of the same, parts being broken away.

My invention relates to certain new and useful improvements in the class of double-shovel plows especially designed for side-hill plowing; and the invention consists in a novel construction and combination of parts, whereby I am enabled to adjust the left-hand shovel on the beam to suit the inclination of the ground, all as will be hereinafter fully described, and specifically pointed out in the claim.

In the drawings, E represents the plow-beam, having secured upon the right-hand side thereof the shovel-standard H.

F represents the left-hand shovel-standard, pivoted at its forward end to the beam E, and having a segmental perforated plate, A, formed with or secured thereto, said standard working in a hasp, B, secured to the side of the plow-beam, which limits the vertical movement of said standard.

C represents a spring-bar, having secured to its inner end a bolt, D, adapted to pass through the beam E and one of the holes b in the plate A, for securing the standard F when adjusted so that the plow may be above or below the plow of the standard H.

It will be observed by the construction above described that I am enabled to adjust the plow-standard F either to bring the plow above or below the plow of standard H, to suit the inclination of the ground, and also as to the relative positions of the plows in going back and forth across the field to be plowed.

The spring-bar C extends backward under and near the handles G of the plow, so that the operator can readily throw the bolt D out of engagement with the plate A when it is desired to adjust the position of the plow of standard F relative to the inclination of the ground and the position of the plow of standard H.

I am aware that double-shovel plows having the plow-standards adapted to be adjusted so as to have one plow run deep and the other shallow, or to run at a greater or less depth in the ground, are old, and such I do not wish to be understood as claiming, broadly, as of my invention.

Having thus fully described my invention, what I claim as new, and desire to secure by Letters Patent, is—

The herein-described double-shovel side-hill plow, composed of the single beam E, having plow-standard H rigidly connected thereto, the hasp B, secured to said beam, the standard F, provided with perforated segmental plate A, and spring-bar C, having a bolt, D, for adjustably securing said plate A to the beam E, as and for the purpose herein shown and described.

JOHN R. WILSON.

Witnesses:
SAMUEL H. BRADEN,
JOHN MUNNEL.